No. 757,800. PATENTED APR. 19, 1904.
J. J. WILLIAMS.
WIND MOTOR.
APPLICATION FILED MAR. 16, 1904.
NO MODEL. 5 SHEETS—SHEET 1.
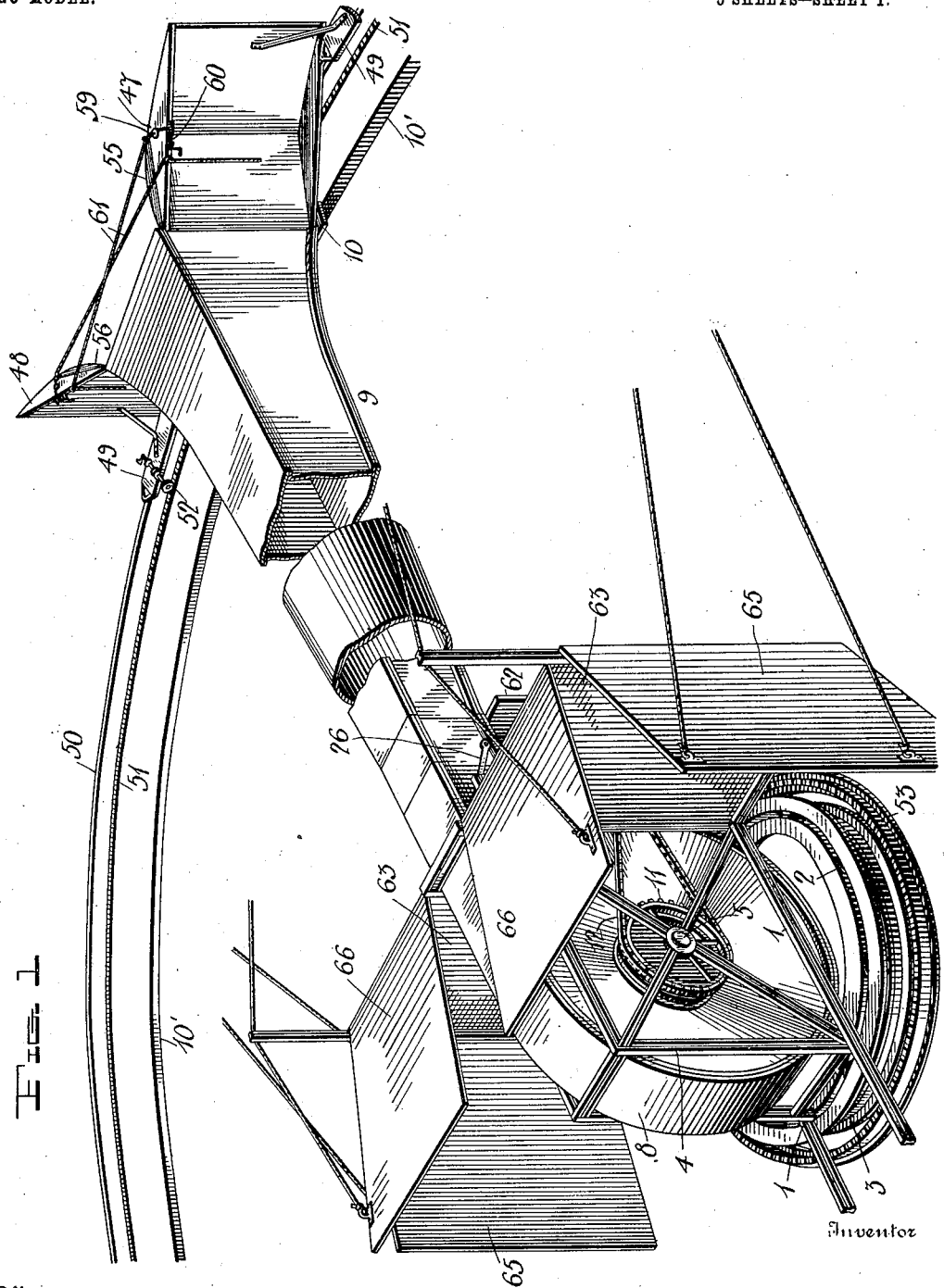

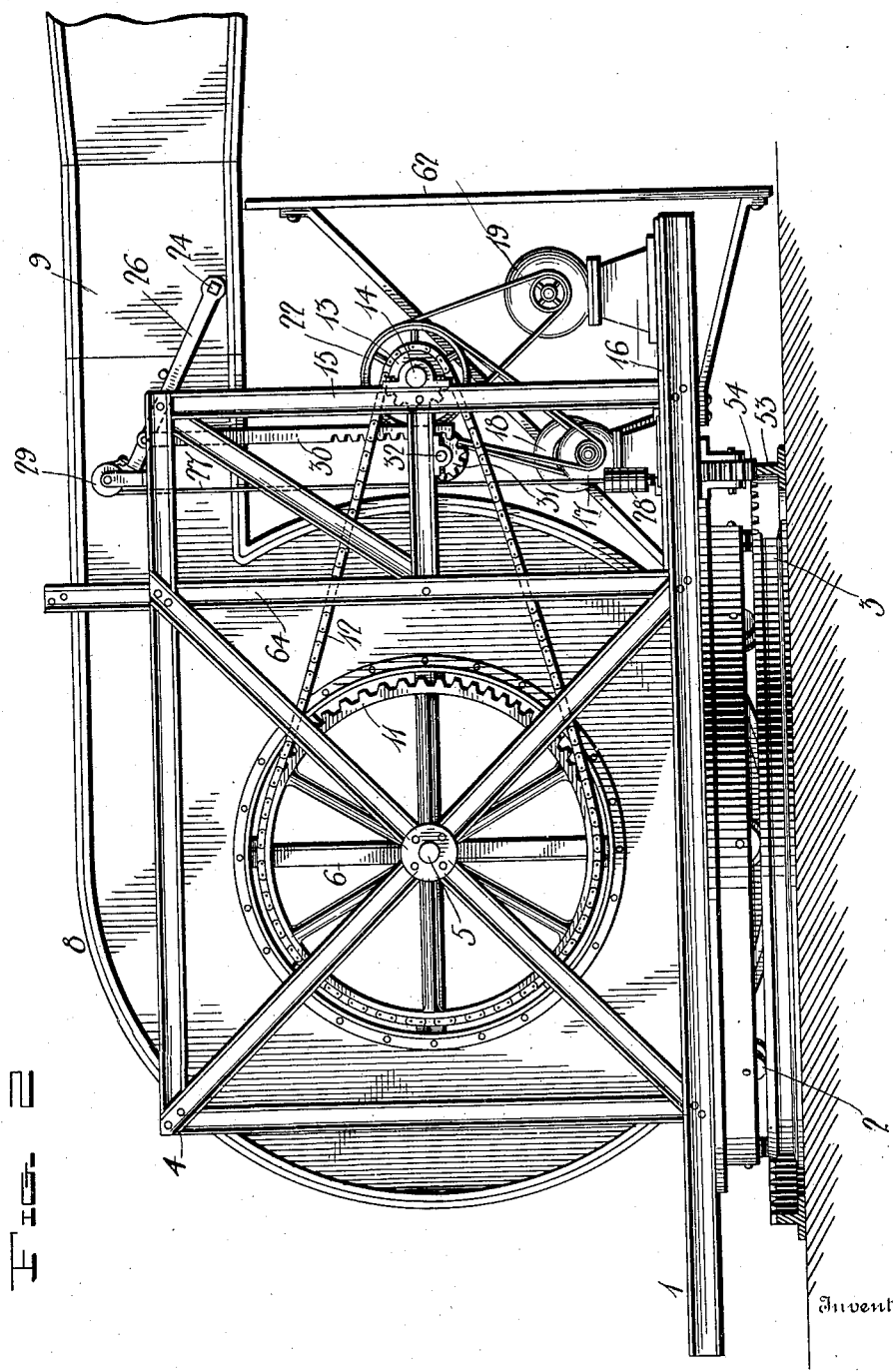

No. 757,800. PATENTED APR. 19, 1904.
J. J. WILLIAMS.
WIND MOTOR.
APPLICATION FILED MAR. 16, 1904.
NO MODEL. 5 SHEETS—SHEET 3.
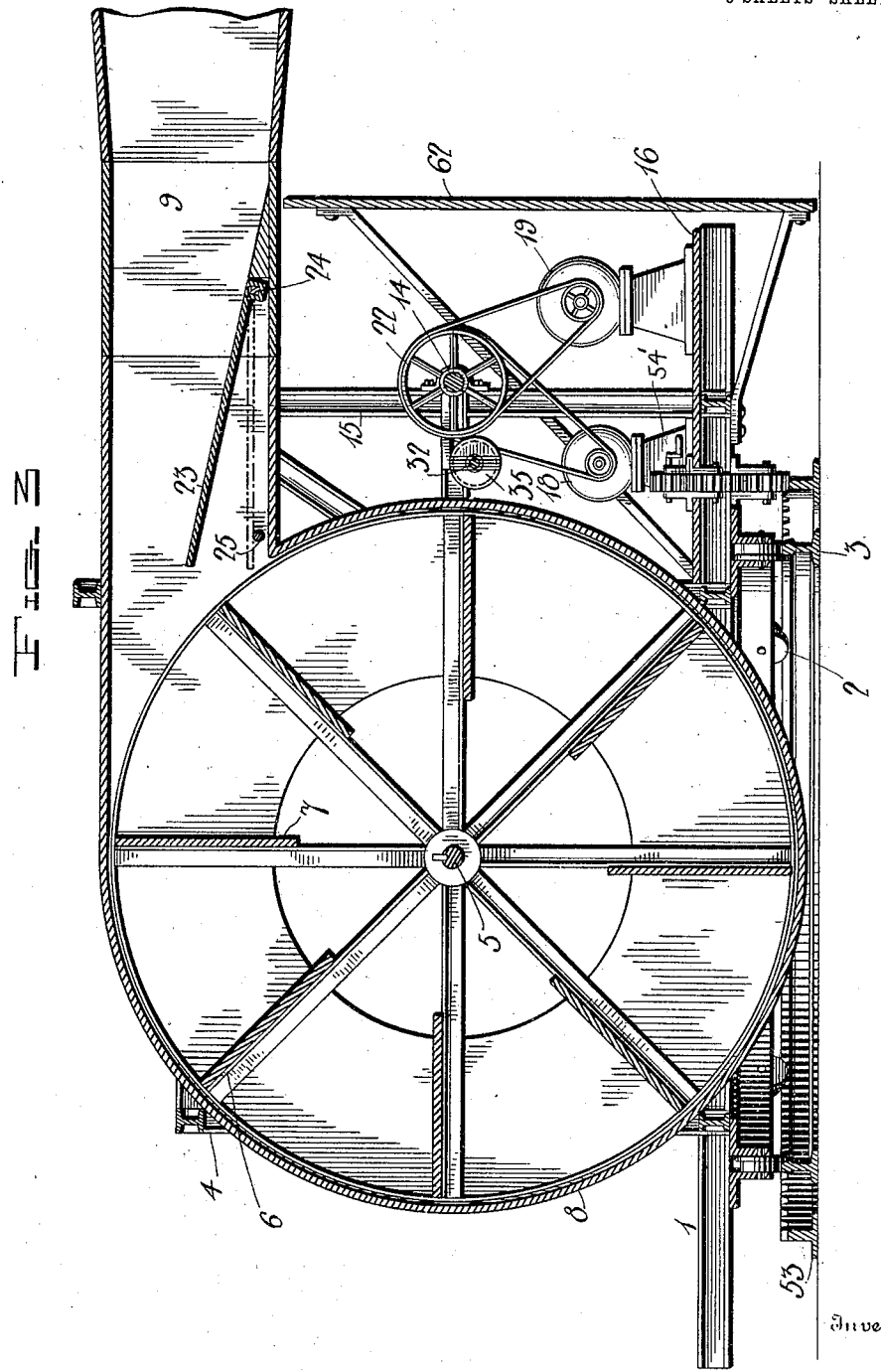
Witnesses
Inventor
Joseph J. Williams
By Dudley, Brown & Nolan
His Attorneys No. 757,800. PATENTED APR. 19, 1904.
J. J. WILLIAMS.
WIND MOTOR.
APPLICATION FILED MAR. 16, 1904.
NO MODEL. 5 SHEETS—SHEET 4.
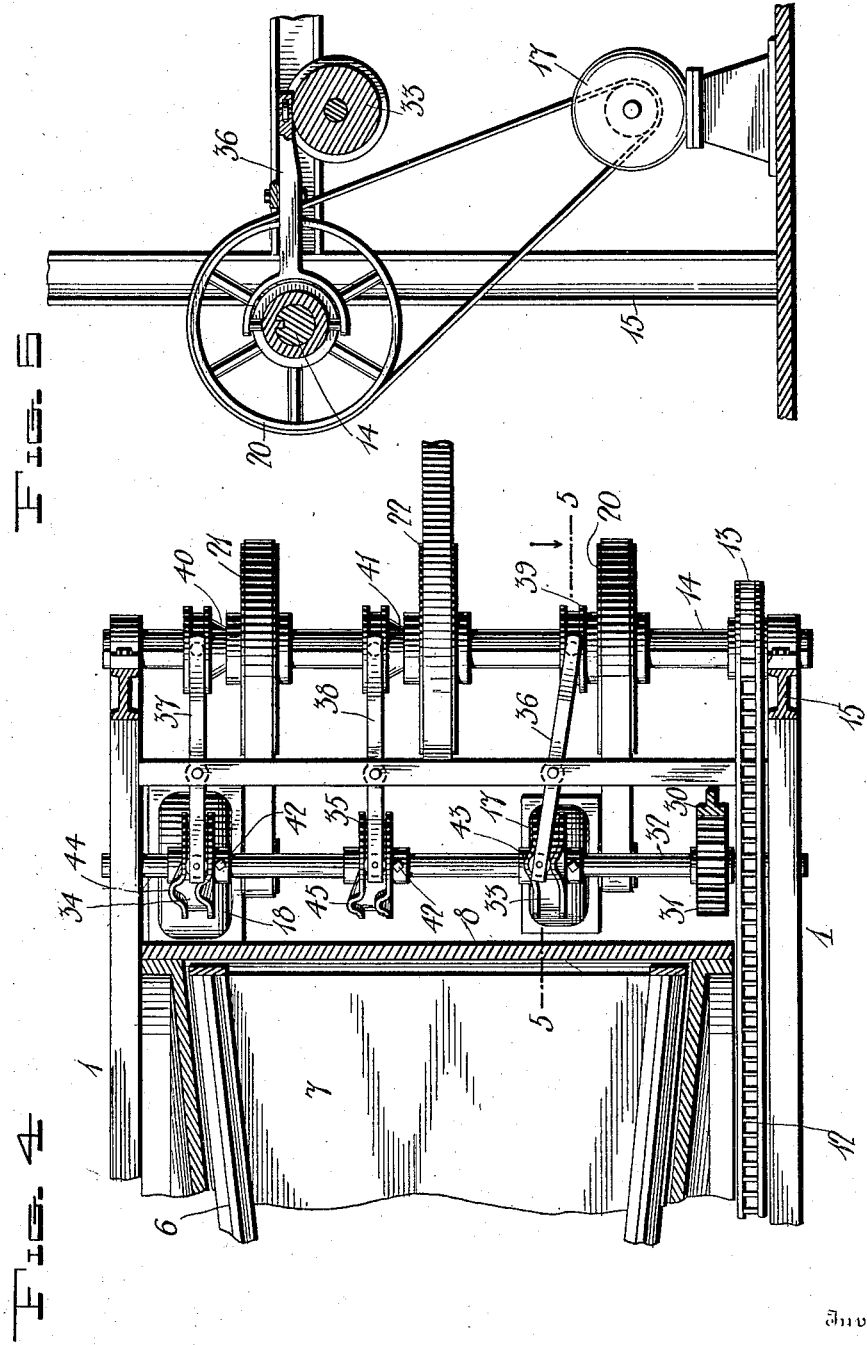
Inventor
Joseph J. Williams No. 757,800. PATENTED APR. 19, 1904.
J. J. WILLIAMS.
WIND MOTOR.
APPLICATION FILED MAR. 16. 1904.
NO MODEL. 5 SHEETS—SHEET 5.
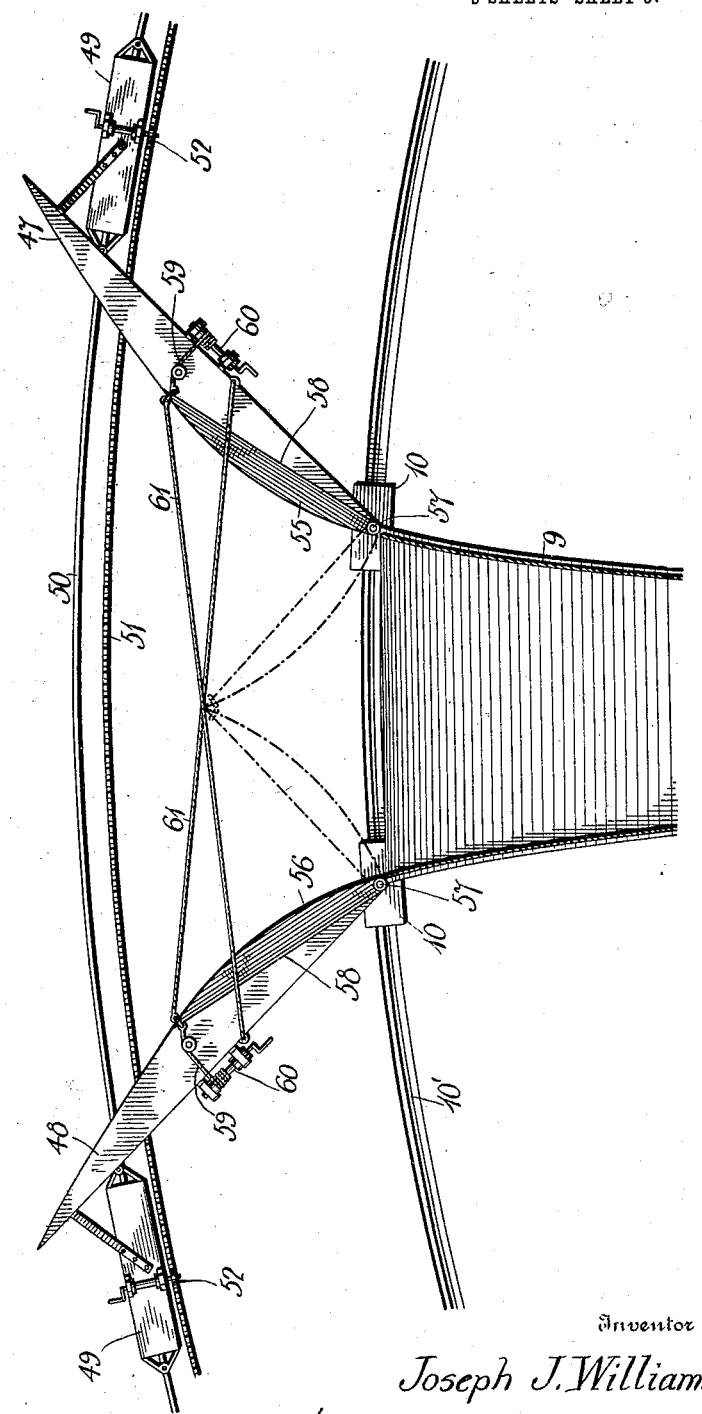
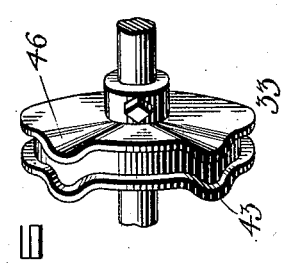
Witnesses
Inventor
Joseph J. Williams
By Dudley, Browne & Nelson
his Attorneys No. 757,800. Patented April 19, 1904.

UNITED STATES PATENT OFFICE.

JOSEPH J. WILLIAMS, OF OKLAHOMA, OKLAHOMA TERRITORY.

WIND-MOTOR.

SPECIFICATION forming part of Letters Patent No. 757,800, dated April 19, 1904.

Application filed March 16, 1904. Serial No. 198,466. (No model.)

*To all whom it may concern:*

Be it known that I, JOSEPH J. WILLIAMS, a citizen of the United States, residing at Oklahoma, in the county of Oklahoma, Oklahoma Territory, have invented certain new and useful Improvements in Wind-Motors; and I do hereby declare the following to be a full, clear, and exact description of the invention, such as will enable others skilled in the art to which it appertains to make and use the same.

This invention relates to wind-motors, and has for its purpose the production of a machine of this character which is capable of developing high-power capacity for general utilization, but more especially for driving electric generators, an object being to provide a central power-plant comprising a number of wind-motors operatively connected with one or more generators to obtain current for distant usage either directly through the medium of a conductor or indirectly through the medium of charged storage batteries.

It will be understood that the operation of the improved machine depends upon wind-pressures not necessarily constant in degree and that the machine is inoperative in the absence of such pressures. To render the plant efficient for the supply of power in the absence of requisite wind-pressures, there are provided storage batteries charged by the generators during the operation of the machine and which are furnished to the consumers, or the current therefrom may be supplied at the plant by conductors leading to the points of utilization.

A feature of the invention is the means employed for automatically controlling the generation of power, which means is actuated by the varying wind-pressures. It is my purpose to employ a number of electric generators of different capacities and to connect the same with the moving part or wheel and with a movable wind-vane in a manner to effect the alternate coupling and uncoupling of the generators, whereby the operation of each is dependent upon a predetermined wind velocity and its rated capacity is not exceeded. I have shown, for example, three generators having different capacities and driven from a common shaft in which are clutches automatically thrown in and out, whereby only one of said generators is in operation at one time, the generator in action being driven by wind velocities within certain predetermined limits, which when varied will cause the said generator to be thrown out of action and will bring into operation the generator having the greater or less capacity, dependent upon whether the wind velocity increases or decreases. As hereinafter pointed out, however, it is within the scope of my invention to so couple the several generators as to obtain their simultaneous operation or the simultaneous operation of a number of them, and the above-stated plan of alternately operating the generators is not to be regarded as a limitation.

Other features of the invention, together with the many advantages derived from the employment of my improved machine, are fully and clearly set forth in the following detailed description, in connection with which reference is to be had to the accompanying drawings, illustrating the invention in its preferred form of embodiment, it being understood that various modifications may be made therein without exceeding the scope of the concluding claims.

In the drawings, Figure 1 is a perspective view of a wind-motor embodying my invention. Fig. 2 is a side elevation of the same, on a larger scale. Fig. 3 is a vertical longitudinal sectional view. Fig. 4 is a further enlarged detail plan view of the generator-controlling means. Fig. 5 is a sectional view on line 5 of Fig. 4 viewed in the direction of the arrow. Fig. 6 is a perspective view of one of the cams employed, showing a modification. Fig. 7 is a detail plan view of the nozzle-deflectors and controlling-gates.

Referring to the drawings by numerals, 1 designates the base-frame of the machine, which is supported through the medium of wheels 2 on a circular track 3, whereby it is horizontally revoluble to bring it in the wind. The drawings illustrate a single machine or motor so supported; but it is within the scope of my invention to similarly support a number of machines or to employ a plurality of circularly-disposed stationary machines each facing a different point of the compass, whereby one or more machines are in action regardless of the direction of the wind.

Erected on the base-frame are side frames 4 4, in which are bearings for the shaft 5 of a wheel 6, equipped with blades 7. A casing 8, inclosing the wheel, is supported in the frames 1 4, the casing sides having central openings for the escape of air.

9 is a nozzle for admitting air to the casing and wheel-blades, said nozzle being tangential to the casing and increasing in diameter toward the forward end or mouth. The nozzle may be of any form in cross-section, but is preferably rectangular at its joint with the casing and at its mouth. The nozzle is movable with the casing and frame, whereby to bring its mouth in the wind, and is independently supported on wheeled cars or trucks 10, which travel on a circular track 10', concentric with the track 3. The track 10' may be arranged in a depression, as shown. The air under pressure entering the casing from the nozzle in the form of a jet impacts against the blades and rotates the wheel and shaft and finally escapes through the openings in the casing sides, as stated.

On the shaft is a relatively large sprocket gear-wheel 11, connected by a chain 12 with a relatively small wheel 13, keyed on a shaft 14, journaled in bearings on uprights 15, forming a forward extension of the main frame. Supported by a platform 16 at the front of the casing are three electric generators 17, 18, and 19 of different capacities. It will be understood that the number of generators may be increased or diminished and that in lieu of electric generators other classes of machines may be employed. The generators are separately driven from the shaft 14 by pulley-and-belt connections, the shaft-pulleys, which are loose, being numbered 20, 21, and 22.

As above stated, where a plurality of generators are employed they are alternately operated, the power being shifted from one to the other as the wind velocity increases or decreases. To this end I locate in the nozzle and adjacent to the path of movement of the wheel-blades a movable vane 23, hinged on a cross-rod 24 and normally positioned with its free end elevated to direct the air-currents against the outer portions of the blade-surfaces, whereby the greatest leverage is obtained during light winds. The free end of the vane is depressed to expose an increased area of the blade-surfaces as the wind velocity increases, the limit of such movement being fixed by a cross-rod 25. This change in position of the vane is utilized to obtain the alternate action of the generators, the generators 17, 18, and 19 being in one plan of operation successively brought into action as the wind-pressure increases. Fixed to the cross-rod 24, outside of the nozzle, is an arm 26, to the free end of which is attached a rope or chain 27, carrying a weight 28, whereby the vane is normally elevated at its free end, the rope or chain being intermediately passed around a sheave 29. Pivoted to and depending from the arm is a rack-bar 30, the teeth of which mesh with the teeth of a pinion 31, fixed on a shaft 32, journaled in bearings on the frame extension. On the shaft are three cams 33, 34, and 35, having peripheral cam-grooves in which rest the roller-equipped ends of three clutch-arms 36, 37, and 38, the clutches 39, 40, and 41 being located, respectively, at the pulleys 20, 21, and 22 and operating to couple and uncouple the latter from the shaft 14. The cams are each provided with a hub through which is passed a set-screw 42, and said cams are thereby adjustable to bring their offsets 43, 44, and 45 successively into engagement with the clutch-arms, whereby the three generators are successively operated, it being understood that the cam-grooves are so formed as to effect the uncoupling of one generator in advance of or, if desired, simultaneously with the coupling or clutching of the next adjacent generator. In lieu of uncoupling a generator in advance of or simultaneously with the coupling of the next adjacent generator I may adjust the cams to successively bring into operation the several generators without effecting the alternate uncoupling action referred to, as by this arrangement I am enabled to similarly control the velocity of the wheel within certain limits by thus increasing the load, it being understood that the different-sized generators will be differently geared, whereby the rated capacity of each is at no time exceeded, or in lieu of adjusting the cams they may, as shown in Fig. 6, be provided with additional offsets 46, whereby to similarly bring into action two or more generators successively. It will be understood that the rotation of the cams is effected automatically by the movement of the vane and the interposed arm, rack-bar, and pinion, and also that upon a diminution of wind-pressure the action of the clutches is reversed to restore the previously-existing conditions.

At the mouth or inlet end of the nozzle are deflectors 47 48, consisting of vertically-disposed plates arranged at angles which preferably exceed the angles of divergence of the nozzle-walls. Each deflector is supported at its inner end on a truck or car 10, and is therefore movable with the nozzle and other parts of the motor. The deflectors are each supported at its outer end on a car or truck 49, traveling on a track 50, and a rack-track 51, and driving-pinions 52 on said cars or trucks 49 coöperate with a concentric rack-track 53 and pinion 54 at the motor-frame for moving the structure to bring the nozzle in the wind. The pinions may be operated by hand or power—as, for example, by the crank-gear 54'. As shown, the deflectors form continuations of the nozzle-walls and direct the air-currents into the mouth of the nozzle, which mouth is preferably flared. To control the admission of air-currents and to completely close the nozzle when desirable or necessary, I provide gates 55 56, hinged at 57 and which are foldable into recesses 58 in the deflectors to completely open the nozzle or which may occupy any position between the opening and closing positions shown, respectively, in full and dotted lines, whereby to partially or wholly cut off the air-currents from the nozzle. The gates are moved by ropes or cables 59, passed around windlasses 60, and are steadied by guy ropes or cables 61.

To protect the motor from the action and influence of the wind, I provide suitably-braced guards, one of which, 62, is at the front of the motor-frame and casing. This guard is supported from the motor-frame, as shown. Side guards 63 are also provided to shield the sides of the motor, each guard being vertically hinged to the upright 64 of the side frame 4, whereby it is foldable against said side when desired. Hinged to the outer edge of each side guard is a foldable extension 65, which is positioned to assume approximately the angle shown. Likewise, also, upper foldable guard extensions 66 are provided, the same being hinged to the upper edges of the side guards 63 and are adjusted at the angle shown. By the provision of these guards the motor is effectually protected from the wind and its influences except at the point of admission. The guards in their unfolded positions are suitably braced to resist the wind-pressure.

While I have shown a single motor embodying my improvements, it will be understood and I have so stated that in the preferred arrangement a battery of said motors will be provided, the battery forming a plant of high-power capacity from which power, preferably in the form of electricity, is furnished both for local and distant utilization. Also it is my purpose, as before stated, to render the plant efficient at all times regardless of wind conditions by storing power through the medium of storage batteries, which are charged from the generators when in operation and which are supplied to the consumer or furnish current from the plant through suitable conductors.

By the provision of the wind-guards not only is the motor proper shielded from the wind, but by reason of the employment thereof a partial vacuum is created at the casing, which vacuum operates to facilitate the exhaust of the utilized air-currents through the casing-openings, whereby back pressure on the blades is effectually prevented and the full power of the wheel is obtained.

I claim as my invention—

1. In a wind-motor, a moving part having impact-surfaces, a casing inclosing said part, a nozzle connected with the casing and arranged to direct air-currents against said surfaces, a movable vane exposed to the air-currents, a plurality of generators operatively connected with the moving part, and means between the vane and generators for controlling the operation of the latter.

2. In a wind-motor, a moving part having impact-surfaces, a casing inclosing said part, a nozzle connected with the casing and arranged to direct air-currents against said surfaces, a movable vane in the nozzle, a plurality of generators operatively connected with the moving part, and means between the vane and generators for controlling the operation of the latter.

3. In a wind-motor, a moving part having impact-surfaces, a casing inclosing said part, a nozzle connected with the casing and arranged to direct air-currents against said surfaces, a movable vane exposed to the air-currents, a plurality of electric generators operatively connected with the moving part said generators having different capacities, and means between the vane and generators for effecting the alternate operation of the latter.

4. In a wind-motor, a moving part having impact-surfaces, a casing inclosing said part, a nozzle connected with the casing and arranged to direct air-currents against said surfaces, a vane in said nozzle movable by wind-pressures to expose greater or less areas of said surfaces, a plurality of generators of different capacities, and means including clutches between the vane and generators for controlling the operation of the latter.

5. In a wind-motor, a moving part having impact-surfaces, a casing inclosing said part, a nozzle connected with the casing and arranged to direct air-currents against said surfaces, a vane in said nozzle movable by wind-pressures to expose greater or less areas of said surfaces, a plurality of generators of different capacities operated from a common shaft, gearing between the shaft and moving part, and means including clutches between the vane and generator, driving-pulleys for controlling the operation of the generators.

6. In a wind-motor, a moving part having impact-surfaces, a casing inclosing said part, a nozzle connected with the casing and arranged to direct air-currents against said surfaces, a vane in the nozzle adjacent to the moving part said vane being movable by wind-pressures, a plurality of generators of different capacities, a shaft carrying loose pulleys connected with the generator-shafts, sprocket-gearing connecting said shaft and moving part, a shaft carrying cams and rotated by the movement of the vane, and clutches for said pulleys operated by said cams.

7. In a wind-motor, a wheel carrying blades, a nozzle arranged to direct air-currents against said blades, a vane in the nozzle movable by wind-pressures, a plurality of generators, a shaft operated from the wheel, loose pulleys on said shaft connected with the generator-shafts, a second shaft, cams adjustable on said second shaft, a pinion on the cam-shaft, an arm movable with the vane, a rack-bar between the arm and pinion, and clutches between the pulleys and cams.

8. In a wind-motor, a cylindrical casing having side exhaust-openings, a blade-wheel in the casing, a nozzle leading tangentially into the casing, said nozzle increasing in size from its inner end and terminating in a flaring mouth, curved deflectors at the sides of the nozzle-mouth and nozzle-controlling curved gates at the front of the deflectors, said deflectors and gates forming continuations of the nozzle-walls.

9. In a wind-motor, a wheel carrying blades, a nozzle arranged to direct air-currents against said blades said nozzle increasing in diameter toward its inlet end, deflectors at the sides of the inlet end, and a gate at said end formed in two sections foldable into recesses in the deflectors.

10. In a wind-motor, a cylindrical casing having side exhaust-openings, a blade-wheel in the casing, a nozzle leading tangentially into the casing, said nozzle increasing in size from its inner end, and wind-guards adjacent to the cylinder exhaust-openings and providing a partial vacuum at the latter.

11. In a wind-motor, a cylindrical casing having side exhaust-openings, a blade-wheel in the casing, a nozzle connected tangentially with the casing, a wind-guard at the front and sides of the casing, the side portions of the guard being adjacent to the casing exhaust-openings, whereby to provide a partial vacuum at the latter.

12. In a wind-motor, a casing, a wheel therein carrying blades, a nozzle connected with the casing and arranged to direct air-currents against said blades, a wind-guard at the front of the motor, and foldable guards at the sides of the motor each formed of foldable sections.

13. In a wind-motor, a casing, a wheel therein carrying blades, a nozzle connected with the casing and arranged to direct air-currents against said blades, a wind-guard at the front of the motor, side guards hinged to the motor-frame, and foldable upper and side-guard extensions hinged to said side guards.

14. In a wind-motor, a casing, a wheel therein carrying blades, a nozzle connecting with the casing and arranged to direct air-currents against said blades said nozzle increasing in diameter from its inner end and terminating in a flared mouth, deflectors at the mouth having curved surfaces and recesses, nozzle-controlling gates foldable into said recesses, means for adjusting the gates, wheeled supports for the motor, the outer nozzle end and the deflectors, tracks for said wheeled supports, and means for moving the structure on said tracks.

In testimony whereof I affix my signature in presence of two witnesses.

JOSEPH J. WILLIAMS.

Witnesses:
  W. T. NORTON,
  E. L. WHITE.